United States Patent
Bao et al.

(10) Patent No.: US 7,194,141 B1
(45) Date of Patent: Mar. 20, 2007

(54) IMAGE RESOLUTION CONVERSION USING PIXEL DROPPING

(75) Inventors: Yilliang Bao, Redondo Beach, CA (US); Maged Bishay, Costa Mesa, CA (US); Joshua I. Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 646 days.

(21) Appl. No.: 10/102,105

(22) Filed: Mar. 20, 2002

(51) Int. Cl.
 *G06K 9/40* (2006.01)
(52) U.S. Cl. ............... 382/254; 382/274; 382/275; 358/3.26; 358/3.27
(58) Field of Classification Search ................ 382/209, 382/219, 282, 298, 299, 254, 274, 275, 300, 382/286; 358/1.2, 537, 449, 451, 453, 3.26, 358/3.27, 525
See application file for complete search history.

(56) References Cited

U.S. PATENT DOCUMENTS

| | | | | |
|---|---|---|---|---|
| 4,841,375 A * | 6/1989 | Nakajima et al. | ............ | 358/466 |
| 5,305,117 A * | 4/1994 | Oshita | ......................... | 358/451 |
| 5,724,480 A * | 3/1998 | Yamaura | ..................... | 704/219 |
| 5,838,158 A * | 11/1998 | Beck et al. | .................. | 324/636 |
| 5,847,847 A * | 12/1998 | Kosaka | ........................ | 358/508 |
| 5,867,814 A * | 2/1999 | Yong | .......................... | 704/216 |
| 5,943,443 A * | 8/1999 | Itonori et al. | ............... | 382/225 |
| 5,949,434 A | 9/1999 | Charlton | ..................... | 345/439 |
| 6,141,061 A | 10/2000 | Takeuchi | .................... | 348/581 |
| 6,331,902 B1 | 12/2001 | Lin | ........................... | 358/1.9 |
| 6,373,897 B1 * | 4/2002 | Taniguchi | .............. | 375/240.21 |
| 6,398,735 B1 * | 6/2002 | Clark | ........................... | 600/458 |
| 6,463,210 B1 * | 10/2002 | Yokogawa | .................. | 386/125 |
| 6,608,877 B1 * | 8/2003 | Wuppermann et al. | ..... | 375/377 |

* cited by examiner

*Primary Examiner*—Samir Ahmed
*Assistant Examiner*—Yosef Kassa
(74) *Attorney, Agent, or Firm*—Farjami & Farjami LLP

(57) ABSTRACT

A system for generating image conversion data is provided. The system includes a numerator buffer storing numerator data of a conversion ratio, such as where the numerator of the ratio represents the relative current size of a set of image data and the denominator of the ratio represents the relative size of the target set of image data. A denominator buffer stores denominator data of the conversion ratio. A pixel sample control system receives the numerator data and the denominator data and generates pixel sample control data that is used to select a pixel from a pixel data stream, such as to allow a pixel dropping sequence or a pixel duplication sequence to be generated based on the values stored in the numerator buffer and the denominator buffer.

28 Claims, 4 Drawing Sheets

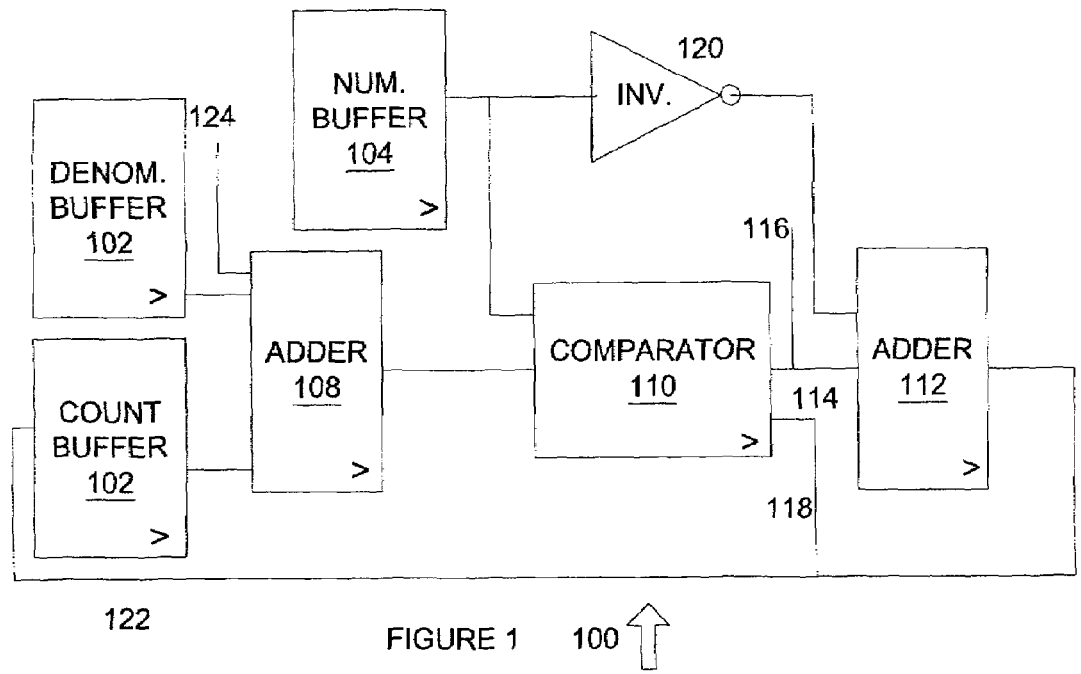

IMAGE RESOLUTION CONVERSION USING PIXEL DROPPING

BACKGROUND OF THE INVENTION

1. Field of the Invention

The invention relates generally to image processing; and, more particularly, to a system and method for image resolution conversion that use pixel dropping or duplication to allow a user to reduce or enlarge image data by an amount that can be expressed as a ratio of two integers.

2. Background of the Invention.

Conventional image processing systems that perform image resolution conversion commonly employ bi-linear interpolation. Bi-linear interpolation requires the use of multipliers that are relatively large in size and thus occupy a large amount of space. In addition, bi-linear interpolation can also require the addition of line buffers in order to support vertical scaling, which can also be relatively large in size. Multi-tap filters are also commonly employed in conventional image resolution conversion systems. These devices are expensive and also require line memories that occupy a large amount of space. In addition to requiring significant amounts of space, these conventional systems also provide a fixed number of resolution settings for performing image resolution conversion.

SUMMARY OF THE INVENTION

In accordance with the present invention, a system and method for image resolution conversion are provided that overcome known problems with systems and methods for image resolution conversion.

In particular, a system and method for image resolution conversion are provided that uses pixel selection logic to improve processing efficiency and flexibility.

In accordance with an exemplary embodiment of the present invention, a system for generating image conversion data is provided. The system includes a numerator buffer storing numerator data of a conversion ratio, such as where the numerator of the ratio represents the relative current size of a set of image data and the denominator of the ratio represents the relative size of the target set of image data. A denominator buffer stores denominator data of the conversion ratio. A pixel sample control system receives the numerator data and the denominator data and generates pixel sample control data that is used to select a pixel from a pixel data stream, such as to allow a pixel dropping sequence or pixel duplication sequence to be generated based on the values stored in the numerator buffer and the denominator buffer.

The present invention provides many important technical advantages. One important technical advantage of the present invention is a pixel dropping or duplication system that includes a numerator buffer and a denominator buffer, where the pixels that are dropped or duplicated in a given pixel sequence are selected based on the data stored in the numerator buffer and the denominator buffer, so as to allow the image conversion ratio to be readily changed to a user-selected value of the ratio of two integers.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE SEVERAL VIEWS OF THE DRAWINGS

The components in the figures are not necessarily to scale, emphasis instead being placed upon illustrating the principles of the invention. In the figures, like reference numerals designate corresponding parts throughout the different views.

FIG. 1 is a diagram of a system for image resolution conversion in accordance with an exemplary embodiment of the present invention;

FIG. 2 is a diagram of exemplary pixel conversion sequences or line conversion sequences in accordance with an exemplary embodiment of the present invention;

DETAILED DESCRIPTION OF THE INVENTION

Figure 3:
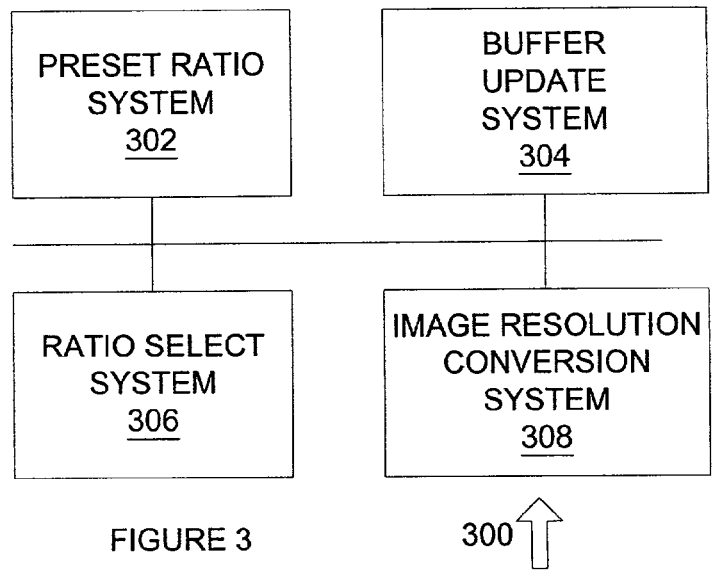
FIG. 3 is a diagram of a system for setting conversion ratios in accordance with an exemplary embodiment of the present invention.

FIG. 1 is a diagram of a system 100 for image resolution conversion in accordance with an exemplary embodiment of the present invention. System 100 provides an efficient implementation of a pixel-dropping image resolution conversion system that allows a set of image data to be reduced or increased by an amount that can be expressed as a ratio of integers.

System 100 includes denominator buffer 102 and numerator buffer 104, each of which can be implemented in hardware, software, or a suitable combination of hardware and software, and which can be one or more hardware systems or one or more software systems operating on a suitable processor platform. As used herein, a hardware system can include discrete or integrated semiconductor devices implemented in silicon, germanium, or other suitable materials; an application-specific integrated circuit; a field programmable gate array; or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system of a digital signal processor, and one or more lines of software in a specific purpose software application.

Denominator buffer 102 and numerator buffer 104 are used to store data representing the denominator and numerator of an image resolution conversion ratio. As used herein, an image reduction ratio is expressed as X/Y, where X represents the current size of the image and Y represents the target size for the reduced image. In this exemplary embodiment, numerator buffer 104 can store an integer value representing the current relative image size, and denominator buffer 102 can store an integer value representing the target relative image size. For example, reducing a set of image data from its current size to a size that is four-fifths of its current size would result in a numerator of five and a denominator of four. Likewise, other suitable integer values for numerators and denominators can be selected, such as where image data is to be increased. In another exemplary embodiment, system 100 operates in a first mode where the numerator buffer 104 and denominator buffer 102 are used to express a reduction ratio, and in a second mode where they are used to express an increase ratio. Thus, a ratio of X/Y in the first mode would result in a decrease in relative size from "X" to "Y," whereas in the second mode it would result in an increase in relative size from "Y" to "X." Likewise, other suitable configurations can be provided.

Denominator buffer 102 and count buffer 106 are coupled to adder 108. As used herein, the term "couple" and its cognate terms, such as "coupled" and "couples," can include a physical connection (such as through a conducting material in a semiconductor circuit), a logical connection (such as through one or more logical devices of a semiconducting circuit), a virtual connection (such as through one or more randomly assigned memory locations of a data memory device), other suitable connections, or a suitable combination of such connections. In one exemplary embodiment, systems or components can be coupled to other systems and components through intervening systems and components, such as through an operating system of a digital signal processor platform.

The data stored in denominator buffer 102 and the data stored in count buffer 106 are added by adder 108 when a pixel increment indicator is received by pixel increment input 124. Pixel increment input 124 can be a clock signal when one pixel of data is processed per clock cycle. Likewise, clock signals can be provided to other components of system 100, although in the exemplary embodiment shown in FIG. 1, only the adder 108 requires a clock signal or other pixel increment indicator. Adder 108 outputs the sum of the data in denominator buffer 102 and count buffer 106 to comparator 110.

Comparator 110 compares the sum of the data stored in denominator buffer 102 and count buffer 106 to the data stored in numerator buffer 104. Comparator 110 then generates an output 114 if the sum of the data stored in denominator buffer 102 and the data stored in count buffer 106 is greater than the data stored in numerator buffer 104. Output 114 is also provided to pixel sample control 116, such that when the sum of the data stored in denominator buffer 102 and count buffer 106 is greater than the data stored in numerator buffer 104, the current pixel is sampled, such as by writing the pixel to a data buffer for generation of the reduced image data set, duplicating the pixel for an increased image data set, or in other suitable manners. Likewise, adder 112 receives the signal from output 114 and performs an addition operation of the sum of the data stored in denominator buffer 102 and count buffer 106 and the data output from inverter 120. Inverter 120 receives the data stored in numerator buffer 104 and inverts the data, such that adder 112 is effectively subtracting the data stored in numerator buffer 104 from the sum of the data stored in denominator buffer 102 and count buffer 106. This data is then stored in count buffer 106 as the new value of count buffer 106. Likewise, if comparator 110 determinates that the data stored in numerator buffer 104 is greater than the sum of the data stored in denominator buffer 102 and the data stored in count buffer 106, comparator 110 outputs a signal over output 118 and stores the sum of the data stored in denominator buffer 102 and count buffer 106 as the new value in count buffer 106.

In operation, system 100 uses pixel dropping or duplication to provide resolution conversion for a set of image data from an existing size to a smaller size or a larger size that can be expressed as a ratio of two integers, where the first integer or numerator integer represents the current image size and the second integer represents the target image size for reducing the image size, and where the first integer or numerator integer represents the target image size and the second integer represents the current image size for increasing the image size. In addition to being used for pixel processing in the horizontal axis, system 100 can also be used for processing of lines of image data in the vertical axis, such as when the conversion ratio between the horizontal and vertical axes are the same, are different, or in other suitable embodiments. System 100 can be implemented in silicon, such as using a complementary metal oxide semiconductor process, and thus provides for flexible implementation of image resolution conversion without requiring multipliers, line buffers, bilinear interpolation, or other processes that generally increase the amount of space required for the processing circuit.

FIG. 2 is a diagram 200 of exemplary pixel conversion sequences or line conversion sequences in accordance with an exemplary embodiment of the present invention. Diagram 200 includes pixel sequence 202 and four to three conversion ratio control sequence 204, five to three conversion ratio control sequence 206, five to four conversion ratio control sequence 208, and six to five conversion ratio control sequence 210.

Pixel sequence 202 begins with pixel number "0" and increases by "1" with each next pixel. In one exemplary embodiment, pixel sequence 202 can be initiated for each new line, or other suitable pixel sequencing can be used.

Four to three conversion ratio control sequence 204 shows pixel sample control data indicators for a four to three reduction ratio or a three to four increase ratio, such as by using system 100 to perform pixel sample control data generation. A four to three reduction ratio indicates that the current image size has a relative size of four and that the new image size will have a relative size of three, such that the new image size will be 75% of the current image size. Alternatively, a four to three increase ratio indicates that the current image size has a relative size of three and that the new image size will have a relative size of four, such that the new image size will be 133% of the current image size. Depending on the convention used, this could either be called a four to three reduction or increase ratio, a three to four reduction or increase ratio, or other suitable conversion ratios; however, as used herein, a four to three reduction ratio shall refer to the reduction of an existing set of image data having a relative size of four to a set of image data having a relative size of three, and a four to three increase ratio shall refer to the increase of an existing set of image data having a relative size of three to a set of image data having a relative size of four, so as to correspond with the numerator and denominator buffers previously discussed. For the first pixel value having a count value of "0," the sequence of pixel sample controls as shown starts off with a first "NO" sample control representing that the corresponding pixel data for that sequence should either not be sampled (for reduction) or that duplication of that pixel should not be suppressed (for increases), a second "NO," and three subsequent "YES" sample controls representing that the corresponding pixel data for those sequence positions should either be sampled (for reduction) or that duplication should be suppressed (for increases). After the fifth pixel sample (having address number four), a pattern is repeated where the first pixel of a set of four pixels is not sampled or is duplicated, and the next three pixels are. In this manner, uniform pixel sampling to reduce the image size from a relative value of four to a relative value of three or to increase the image size from a relative value of three to a relative value of four is performed.

Likewise, five to three conversion ratio control sequence 206 shows pixel sample control data indicators for reducing a set of image data from a relative size of five to a relative size of three, or enlarging from a relative size of three to a relative size of five. For example, if count buffer 106 is initialized with a data value of "0" and denominator buffer 102 is initialized with a data value of "3," then a "NO" pixel sample/duplicate signal or line display signal will be generated when compared with a numerator data value of "5." Comparator 110 would then generate a new count buffer value of "3" (i.e., the sum of the current value of "3" plus "0"), and the process would proceed to the next step, or pixel sequence number one. At this step, the data stored in denominator buffer 102 has a value of "3" and the data stored in count buffer 106 has a value of "3" such that a data value of "6" is generated by adder 108. Since the value of "6" is greater than the value of the numerator buffer 104, i.e., "5," then the data generated for the second pixel sequence indicates that the pixel data for that sequence position should be sampled, or that the line for that sequence position should be stored. Comparator 110 would then transmit the sum of the data stored in denominator buffer 102 and count buffer 106 (i.e., "6") to adder 112, which would subtract the data stored in numerator buffer 104 (i.e., "5") from the total (to yield "1"). This value would then be stored in count buffer 106. In the next cycle (pixel sequence number two), the sum of the data stored in count buffer 106 (i.e., "1") and denominator buffer 102 (i.e. "3") is "4," such that comparator 110 would not generate a pixel sample control or a pixel duplication suppress control. The process would proceed as shown with a repeatable sequence of "YES," "NO," "YES," "NO," and "YES" being generated.

Likewise, the sequences generated for a five to four conversion ratio control sequence 208 and a six to five conversion ratio control sequence 210 are also shown. As can be seen, a pattern quickly develops that can then be used to generate pixel sample data, either through the use of system 100 or through other suitable systems.

In operation, diagram 200 shows how changing the data stored in denominator buffer 102 and numerator buffer 104 can result in pixel sample data sequences that provide for a desired level of image reduction or increase. Thus, diagram 200 demonstrates how system 100 can be used to provide reduction and increase ratios for an image resolution conversion system or other suitable systems.

FIG. 3 is a diagram of a system 300 for setting conversion ratios in accordance with an exemplary embodiment of the present invention. System 300 includes preset ratio system 302, ratio select system 306, buffer update system 304, and image resolution conversion system 308, each of which can be implemented in hardware, software, or a suitable combination of hardware and software, and which can be one or more hardware systems, one or more software systems operating on a suitable processor platform, or a suitable combination of hardware and software systems.

Preset ratio system 302 provides preset conversion ratios based on user inputs of desired output formats. In one exemplary embodiment, image data can be received in a predetermined image data format such as a VGA image having a 640×480 pixel size, a CIF image having a 352×288 pixel size, an SIF image having a 320×240 pixel size, or other suitable image data formats. Preset ratio system 302 allows a user to select one of these image data formats and generates suitable values for storage in a denominator buffer 102 and numerator buffer 104 based on the image data format selected by the user. For example, if a user selects a CIF image data format for the output, and if the input is in the VGA image data format, then the reduction ratio would be 480/288 or 5/3. Preset ratio system 302 generates the numerator value of "5" and the denominator value of "3" based on the user selection of the CIF output format. Other suitable image data set reduction or increase selections can likewise be made.

Ratio select system 306 generates user prompts for entry of ratio numerators and denominators. In one exemplary embodiment, a user can select a desired reduction ratio or increase ratio and ratio select system 306 will then determine the least common integer values for the denominator and numerator. Ratio select system 306 thus allows a user to try user selectedconversion ratios, such as to overcome potential artifacts from image reduction using pixel dropping or image increases using pixel duplication that may obscure desired features in a set of image data at a selected image conversion ratio. For example, if the image ratio conversion of 5/3 generates image artifacts, ratio select system 306 allows the user to go to a next closest ratio that does not generate such image artifacts, such as a 10/7 ratio, a 20/13 ratio or other suitable ratios. Ratio select system 306 can also provide selection indictors, such as an "UP" arrow and a "DOWN" arrow that allow the user to readily select such ratio changes without requiring the user to manually enter the ratio data. In one exemplary embodiment, a first set of command arrows can allow the user to choose between preselected conversion ratios, such as "5/4"-"5/3"-"6/5," and a second set of command arrows can allow the user to "fine tune" a selected ratio, such as by going from "5/4" to "10/9" to "20/19" by starting from "5/4" and selecting an "UP" arrow command, and by going from "5/4" to "10/7" to "20/17" by starting from "5/4" and selecting a "DOWN" arrow command. In this manner, ratio select system 306 provides additional flexibility to users not present in current image resolution conversion systems.

Buffer update system 304 receives the numerator data value and denominator data value from preset ratio system 302, ratio select system 306, or other suitable systems, and stores the numerator data value and denominator data value in a corresponding numerator buffer and denominator buffer. In one exemplary embodiment, the numerator buffer and denominator buffer can be within image resolution conversion system 308. Image resolution conversion system 308 can be a hardware-implemented system such as that shown in FIG. 1, a software-implemented system on a digital signal processor or other suitable processing platforms, or other suitable combinations of hardware and software systems. Buffer update system 304 can also generate mode data, such as first mode data that indicates that the ratio is a reduction ratio, and second mode data that indicates that the ratio is an increase ratio. Buffer update system 304 can also include a mode output.

In operation, system 300 provides flexibility and ease of use in an image conversion system so that users can readily reduce or increase an image size to a desired conversion ratio. System 300 facilitates the review and analysis of image data by users, helps to eliminate image artifacts caused by pixel dropping or duplication, and provides other suitable functions.

Figure 4:
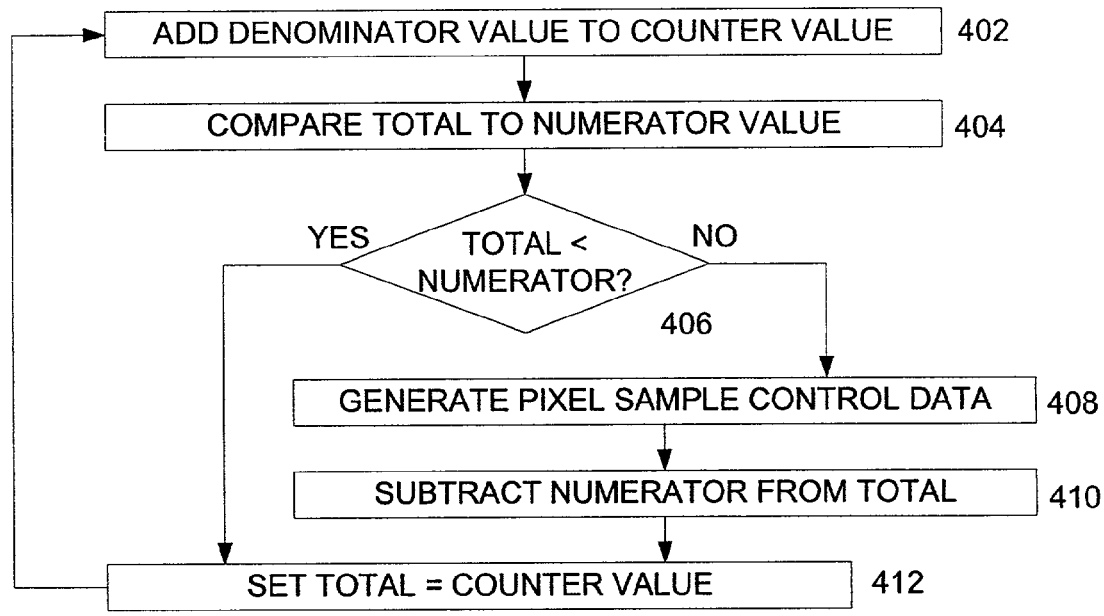
FIG. 4 is a flow chart of a method for image resolution conversion in accordance with an exemplary embodiment of the present invention.

FIG. 4 is a flow chart of a method 400 for image resolution conversion in accordance with an exemplary embodiment of the present invention. Method 400 uses numerator and denominator buffers to process image data so as to provide image resolution conversion using pixel dropping or duplication.

Method 400 begins at 402 where a denominator value is added to a counter value. In one exemplary embodiment, the denominator value can be stored in a denominator buffer or other suitable locations. Likewise, the counter value can be stored in a counter buffer, can be retrieved from a data memory, or other suitable processes can be implemented. The method then proceeds to 404.

At 404 the total value generated at 402 is compared to a numerator value. In one exemplary embodiment, the total value can be compared to a numerator value stored in a buffer, stored in a data memory, or in other suitable locations. The method then proceeds to 406.

At 406 it is determined whether the total data value is less than the numerator data value. If it is determined that the total data value is less than the numerator data value the method proceeds to 412 where the total data value is set equal to the counter data value. The method then returns to 402. Otherwise, the total value is greater than or equal to the numerator data value, and the method proceeds to 408 where pixel sample control data or duplication suppression data is generated. In one exemplary embodiment, the pixel sample control data can cause a current pixel to be sampled and stored, such as in a buffer for generation of a new reduced set of image data. In another example, the pixel duplication suppression data can suppress a pixel from being duplicated, such as in a buffer for generation of a new increased set of image data. The method then proceeds to 410.

At 410 the numerator data value is subtracted from the total data value. The method then proceeds to 412 where the total data value is set equal to the counter data value and the method returns to 402.

In operation, method 400 allows image resolution conversion to be processed using stored values of an image reduction ratio or increase ratio in a numerator/denominator format, such that the values for the numerator and denominator can be readily changed, and such that dedicated circuitry is not required for each set of ratios. In this exemplary embodiment, method 400 can be implemented using hardware, software, or in other suitable embodiments to provide for image conversion ratios at user-selectable combinations of integer reduction ratios.

Figure 5:
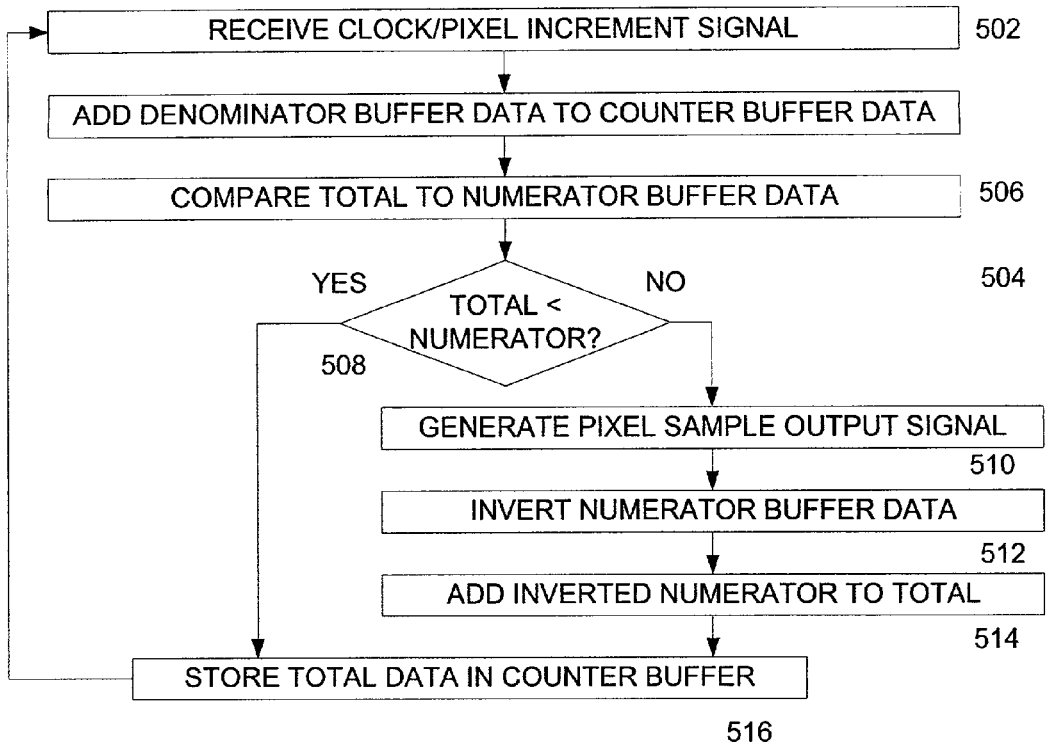
FIG. 5 is a flow chart of a method for processing image data using image conversion circuitry in accordance with an exemplary embodiment of the present invention.

FIG. 5 is a flow chart of a method 500 for processing image data using image conversion circuitry in accordance with an exemplary embodiment of the present invention. Method 500 begins at 502 where a clock signal or pixel increment signal is received. In one exemplary embodiment, a clock signal can be used where a new pixel is processed for each cycle of the clock. Likewise, if a pixel requires more than one clock cycle to be processed, then a pixel increment signal can be received when the next pixel is available for processing. The method then proceeds to 504.

At 504, denominator buffer data is added to counter buffer data. In one exemplary embodiment, the denominator buffer data can be stored in a data buffer and the counter buffer data can also be stored in a data buffer, and the buffer data can be retrieved by an adder in response to receipt of the clock signal or pixel increment signal. The adder can then generate total data equal to the sum of the denominator buffer data and counter buffer data. The method then proceeds to 506.

At 506 the total data is compared to numerator buffer data. In one exemplary embodiment, a comparator can receive the total data from the adder and can retrieve the numerator data from the numerator buffer or other suitable locations. The method then proceeds to 508.

At 508 it is determined whether the total data is greater than the numerator data. In one exemplary embodiment, the comparator can generate a single output having a value of zero or one, where one output state indicates that the total data is less than the numerator data and a second output state indicates that the total data is equal to or greater than the numerator data. Likewise, other suitable combinations of outputs can be generated by the comparator. If it is determined at 508 that the total data is less than the numerator data the method proceeds to 516. If it is determined that the total data is equal to or greater than the numerator data the method proceeds to 510.

At 510 a pixel sample output signal or a pixel duplication suppress output signal is generated. In one exemplary embodiment, the pixel sample/pixel duplication suppress output signal can be the same as the signal indicating that the total data is greater than or equal to the numerator data. Other suitable pixel sample output signals can be generated. The method then proceeds to 512. At 512 the numerator buffer data is inverted, such as by using an inversion circuit or set of circuits. The method then proceeds to 514. At 514 the inverted numerator data is added to the total data to yield the new counter data. The method then proceeds to 516.

At 516, the total data received from the comparator or from the adder after the numerator buffer data has been subtracted from the total data is set equal to the counter data. In one exemplary embodiment, the new counter data is stored in a count buffer 106 or other suitable locations. The method then returns to 502.

In operation, method 500 can be used in conjunction with logic circuitry to process a set of image data to select pixels for dropping to reduce the size of the set of image data in accordance with an integer ratio of the current size to the target size, or to select pixels for duplication to increase the size of a set of image data. Method 500 allows image ratio conversions to be efficiently and quickly processed without the requirement or use of multiplication circuitry or other circuitry that requires significant amounts of space.

Figure 6:
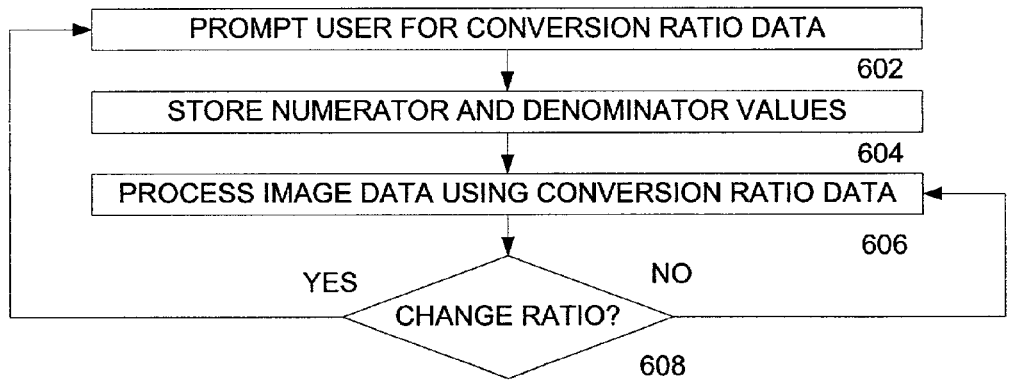
FIG. 6 is a diagram of a method for adjusting image conversion ratios in accordance with an exemplary embodiment of the present invention.

FIG. 6 is a diagram of a method 600 for adjusting image conversion ratios in accordance with an exemplary embodiment of the present invention. Method 600 begins at 602 where a user is prompted for conversion data. In one exemplary embodiment, the user can be provided with a set of predetermined conversion ratios, such that the user can select one of the ratios and the numerator and denominator data is provided by that single selection. In another exemplary embodiment, the user can enter values for the numerator data and the denominator data, can use indicator commands such as up arrows and down arrows to increase or decrease the reduction/increase ratio or the amount of reduction/increase ratio, or other suitable processes can be used. The method then proceeds to 604.

At 604 the numerator and denominator values are stored. In one exemplary embodiment, the numerator and denominator values can be stored in a data buffer that is used to process a stream of pixel data to determine whether to generate pixel sample control data, such that each pixel is sampled or not sampled as it is received. Other suitable processes can be used. The method then proceeds to 606.

At 606 the image data is processed using the conversion ratio data. In one exemplary embodiment, processing can be performed using logic circuits that retrieve the ratio data values stored in buffers, can be processed using software systems that retrieve the ratio data values from a memory, or other suitable processes can be used. The method then proceeds to 608.

At 608 it is determined whether the user desires to change the ratio. In one exemplary embodiment, the user can change the ratio by entering new ratio data, by selecting ratio increase or decrease indicators, by selecting a new preset ratio, or other suitable ratio changes can be performed. If it is determined at 608 that the user does not want to change the ratio, the method returns to 606. Otherwise, the method returns to 602.

In operation, method 600 allows a user to adjust image conversion ratios as required. The image conversion ratios can be preset ratios, user selected ratios, ratios based on increase or decrease indicators, or other suitable ratios.

Figure 7:
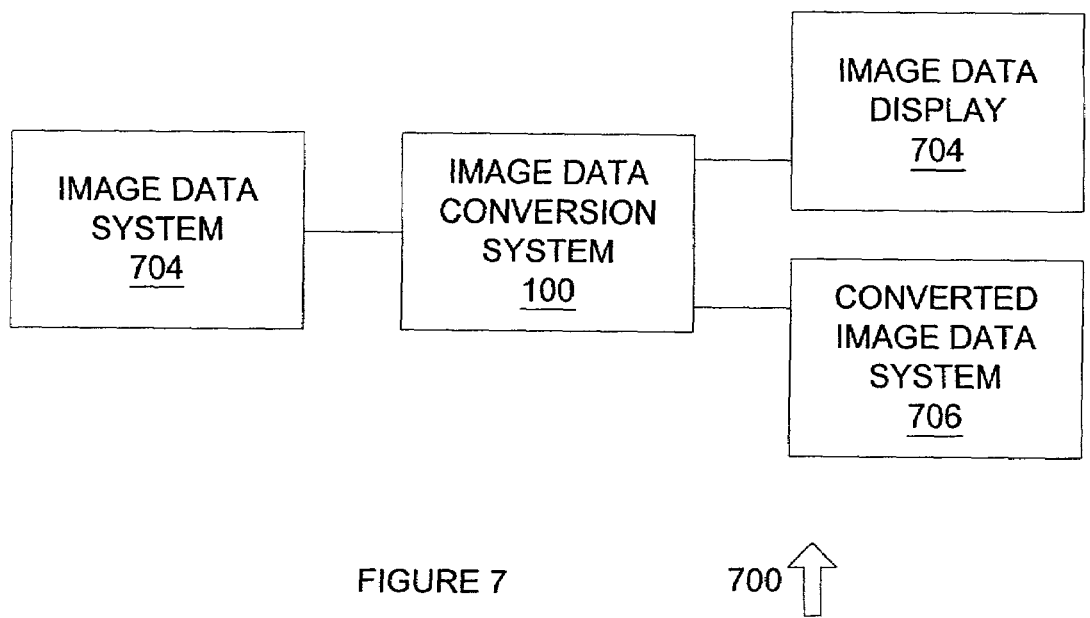
FIG. 7 is a diagram of a system for converting image data to a larger or smaller set of image data in accordance with an exemplary embodiment of the present invention.

FIG. 7 is a diagram of a system 700 for converting image data to a larger or smaller set of image data in accordance with an exemplary embodiment of the present invention. System 700 includes image data conversion system 100 and image data system 702, image data display 704 and converted image data system 706, each of which can be implemented in hardware, software, or a suitable combination of hardware and software, and which can be one or more hardware systems or one or more software systems operating on a suitable processor platform. Image data system 702 includes one or more sets of image data, such as an N×M array of pixel data, color pixel data, or other suitable image data. Image data conversion system 100 receives rows of pixels of data from image data system 702, and performs a conversion of the data to either increase or decrease the size of the set of image data. Image data display 704 can then display, print or otherwise use the converted image data without storing it, such as by receiving each row of converted image data directly from image data conversion system 100. Likewise, converted image data system 706 can store the image data, such as in a buffer for subsequent display, printing, or other suitable functions. System 700 can thus be used to increase image data using pixel duplication, to decrease image data using pixel dropping, or to perform other suitable functions. Converted image data from converted image data system 706 can also or alternatively be provided to image data system 702 to allow image data that has been reduced by pixel dropping to be subsequently increased by pixel duplication, to allow image data that has been increased by pixel duplication to be subsequently decreased by pixel dropping, or for other suitable conversions to be performed. A set of image data can also be decreased from an original image size by pixel dropping, where all subsequent increases back up to the original image size can be accomplished by pixel dropping from the original set of image data. A set of image data can also be increased from an original image size by pixel duplication, where all subsequent decreases back down to the original image size can be accomplished by pixel duplication from the original set of image data. Other suitable processes can also or alternatively be used.

While various embodiments of the invention have been described, it will be apparent to those of ordinary skill in the art that many more embodiments and implementations are possible that are within the scope of this invention.

The invention claimed is:

1. A system for generating image conversion data comprising:
   a numerator buffer storing numerator data of a conversion ratio;
   a denominator buffer storing denominator data of the conversion ratio; and
   a count buffer storing total data;
   an adder coupled to the denominator buffer and the count buffer outputting a sum of the total data and the denominator data;
   wherein the numerator data and the sum of the total data and the denominator data are used to select or reject a pixel from a pixel data stream.

2. The system of claim 1 further comprises a comparator coupled to the adder and the numerator buffer, the comparator generating a first data value if the numerator data is less than the sum of the total data and the denominator data and a second data value if the numerator data is greater than or equal to the sum of the total data and the denominator data, where the second data value is pixel sample control data.

3. The system of claim 2 further comprising:
   an inverter coupled to the numerator buffer inverting the numerator data; and
   a second adder coupled to the inverter, the comparator, and the count buffer, the second adder adding inverted numerator data to the sum of the total data and the denominator data to generate new total data, the second adder storing the new total data in the count buffer.

4. The system of claim 2 further comprises a pixel count input and generates the second data value when the pixel count input is incremented.

5. The system of claim 4 wherein the pixel count input is a clock signal.

6. The system of claim 1 wherein the numerator buffer, the denominator buffer, the count buffer and the adder are each implemented in one or more of the group comprising MOS devices, logical devices, and software systems.

7. The system of claim 1 further comprising a preset ratio system receiving an output format selection and input format data and generating the numerator data and the denominator data based on the output format selection and the input format data.

8. The system of claim 1 further comprising a ratio select system receiving user-entered values for the numerator data and the denominator data.

9. A system for generating image conversion data comprising:
   a numerator buffer storing numerator data of a conversion ratio;
   a denominator buffer storing denominator data of the conversion ratio;
   a count buffer storing total data;
   an adder having a pixel count input coupled to the denominator buffer and the count buffer outputting a sum of the total data and the denominator data when the pixel count input is incremented;
   a comparator coupled to the adder and the numerator buffer, the comparator generating a first data value if the numerator data is less than the sum of the total data and the denominator data and a second data value if the numerator data is greater than or equal to the sum of the total data and the denominator data, where the second data value is pixel sample control data;
   an inverter coupled to the numerator buffer inverting the numerator data; and
   a second adder coupled to the inverter, the comparator, and the count buffer, the second adder adding inverted numerator data to the sum of the total data and the denominator data to generate new total data, the second adder storing the new total data in the count buffer.

10. The system of claim 9 wherein the pixel count input is a clock signal.

11. The system of claim 9 wherein the numerator buffer, the denominator buffer, the count buffer, the adder, the comparator, the inverter and the second adder are each implemented in one or more of the group comprising MOS devices, logical devices, and software systems.

12. The system of claim 9 further comprising a preset ratio system receiving an output format selection and input format data and generating the numerator data and the denominator data based on the output format selection and the input format data.

13. The system of claim 9 further comprising a ratio select system receiving user-entered values for the numerator data and the denominator data.

14. The system of claim 9 further comprising a buffer update system receiving the numerator data and the denominator data and storing the numerator data and the denominator data in the numerator buffer and the denominator buffer, respectively.

15. A method for generating image conversion data comprising:
   adding denominator data from an image conversion ratio to counter data to generate total data;
   comparing the total data to numerator data from the image conversion ratio;
   generating pixel sample control data if the total data is greater than or equal to the numerator data; and
   replacing the counter data with the total data if the total data is less that the numerator data.

16. The method of claim 15 further comprising replacing the counter data with the total data minus the numerator data if the total data is greater than or equal to the numerator data.

17. The method of claim 15 wherein the denominator data is added to the counter data when a pixel count input is incremented.

18. The method of claim 15 further comprising receiving the denominator data and the numerator data from a user.

19. A method for generating image conversion data comprising:
   adding denominator data from an image conversion ratio to counter data to generate total data;
   comparing the total data to numerator data from the image conversion ratio;
   generating pixel sample control data if the total data is greater than or equal to the numerator data; and
   replacing the counter data with the total data minus the numerator data if the total data is greater than or equal to the numerator data.

20. The method of claim 19 wherein the denominator data is added to the counter data when a pixel count input is incremented.

21. The method of claim 19 further comprising receiving the denominator data and the numerator data from a user.

22. A method for generating image conversion data comprising:
   storing numerator data of a conversion ratio;
   storing denominator data of the conversion ratio;
   storing total data;
   adding the total data and the denominator data to output a sum of the total data and the denominator data; and
   selecting or rejecting a pixel from a pixel data stream using the numerator data and the sum of the total data and the denominator data.

23. The method of claim 22 further comprising:
   generating a first data value if the numerator data is less than the sum of the total data and the denominator data; and
   generating a second data value if the numerator data is greater than or equal to the sum of the total data and the denominator data, where the second data value is the pixel sample control data.

24. The method of claim 22 further comprising:
   subtracting the numerator data from the sum of the total data and the denominator data to generate new total data; and
   replacing the total data with the new total data.

25. The method of claim 22 further comprising:
   generating the second data value when a pixel count input is incremented.

26. The system of claim 25 wherein the pixel count input is a clock signal.

27. The methof of claim 22 further comprising:
   receiving an output format selection and input format data; and
   generating the numerator data and the denominator data based on the output format selection and the input format data.

28. The method of claim 22 further comprising:
   receiving user-entered values for the numerator data and the denominator data.

* * * * *

UNITED STATES PATENT AND TRADEMARK OFFICE
CERTIFICATE OF CORRECTION

PATENT NO. : 7,194,141 B1 Page 1 of 1
APPLICATION NO. : 10/102105
DATED : March 20, 2007
INVENTOR(S) : Bao et al.

It is certified that error appears in the above-identified patent and that said Letters Patent is hereby corrected as shown below:

In the claims, 15, column 11, line 32, "is less that" should be changed to --is less than--.

In the claims, 27, column 12, line 37, "methof" should be changed to --method--.

Signed and Sealed this

Nineteenth Day of June, 2007

JON W. DUDAS
*Director of the United States Patent and Trademark Office*